United States Patent
Tseng

(10) Patent No.: US 7,220,042 B2
(45) Date of Patent: May 22, 2007

(54) LIGHT GUIDE PLATE STRUCTURE OF BACKLIGHT MODULE

(75) Inventor: Wen-Pao Tseng, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 120 days.

(21) Appl. No.: 11/074,650

(22) Filed: Mar. 9, 2005

(65) Prior Publication Data

US 2006/0203518 A1 Sep. 14, 2006

(51) Int. Cl.
*F21V 7/04* (2006.01)
(52) U.S. Cl. ..................... 362/619; 362/628
(58) Field of Classification Search ........ 362/612–613, 362/600–602, 606–607, 610, 615, 618–619, 362/628–629
See application file for complete search history.

(56) References Cited

U.S. PATENT DOCUMENTS

| | | | |
|---|---|---|---|
| 2001/0046006 A1* | 11/2001 | Oki et al. | 349/65 |
| 2002/0064037 A1* | 5/2002 | Lee | 362/31 |
| 2004/0012945 A1* | 1/2004 | Yamashita et al. | 362/31 |

\* cited by examiner

*Primary Examiner*—Renee Luebke
*Assistant Examiner*—Julie A. Shallenberger
(74) *Attorney, Agent, or Firm*—Troxell Law Office, PLLC

(57) ABSTRACT

A backlight module installs a light guide plate, a plurality of optical films, and a liquid crystal display panel in order on an emergent plane of a light source, wherein the light guide plate forms more than one hollow layer within an incident side to an effective light emitting area, such that the hollow layer of the light guide plate changes the light path of the light of the light source to effectively distribute and evenly emit the light towards each optical film. As a result, the dark band in each light source can be eliminated, the issue of having dark and bright bands according to the prior arts can be overcome effectively, and the light performance including luminance and evenness can be enhanced.

3 Claims, 6 Drawing Sheets

LIGHT GUIDE PLATE STRUCTURE OF BACKLIGHT MODULE

BACKGROUND OF THE INVENTION

1. Field of the Invention

The present invention relates to an improved light guide plate structure of a backlight module, and more particularly to a light guide plate structure of backlight module capable of preventing the formation of bright and dark bands.

2. Description of the Related Art

Referring to FIG. 1, a cross-sectional view of a conventional backlight module structure for a liquid crystal display is shown. The structure of the whole backlight module comprises a light guide plate 20 disposed at the bottom surface of a liquid crystal display panel 10, an optical film 30 formed by a prism or diffuser and installed at an emergent plane of the light guide plate 20, a reflective panel 40 installed at a reflective plane of the light guide plate 20, and a light source 50 installed on a side. If a light emitted from the light source 50 is projected to the light guide plate 20, the light will be guided and projected upward by the refraction and reflection of the light guide plate 20 and the reflective panel 40, and then the light will pass through the optical film 30 made of a prism or a diffuser to produce evener light emergent from the liquid crystal display panel 10. Since the requirements for the emergent light performance get higher, related manufacturers usually build a pattern 22 with a light reflective function on a reflective plane 21 of the light guide plate 20, and the shape of the pattern 22 could be circular, rectangular or linear. After a light source is reflected by the pattern 22, the light source is guided and emitted successfully to enhance the light performance. Alternatively, the design of the optical film 30 made of a prism or a diffuser is altered to improve the light performance including luminance and evenness.

SUMMARY OF THE INVENTION

It is a primary objective of the present invention to provide a light guide plate structure of a backlight module, which forms at least one hollow layer within an incident side to an effective light emitting area in a panel of the light guide plate, such that the light of a light source changes its path by the hollow layer in the light guide plate to effectively distribute and evenly emit the light.

In other words, the whole light guide plate produces a light path which is different from the traditional light path to the light of the light source. With more active and positive measures, the Mach band issue (having a dark band and a bright band) of the prior art liquid crystal module can be overcome effectively, and thus the light of the light source can be distributed more effectively.

DETAILED DESCRIPTION OF THE PREFERRED EMBODIMENTS

Figure 1:
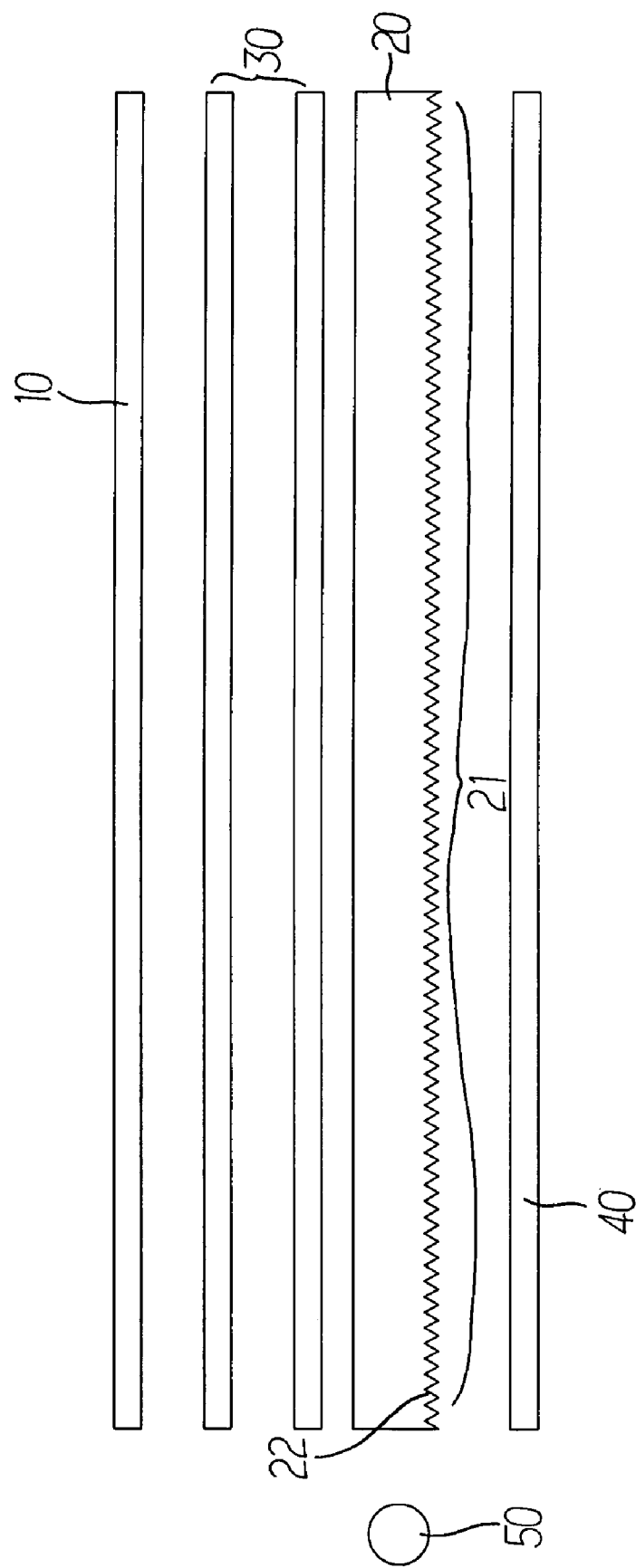
FIG. 1 is a schematic view of the structure of a conventional backlight module.
Figure 2:
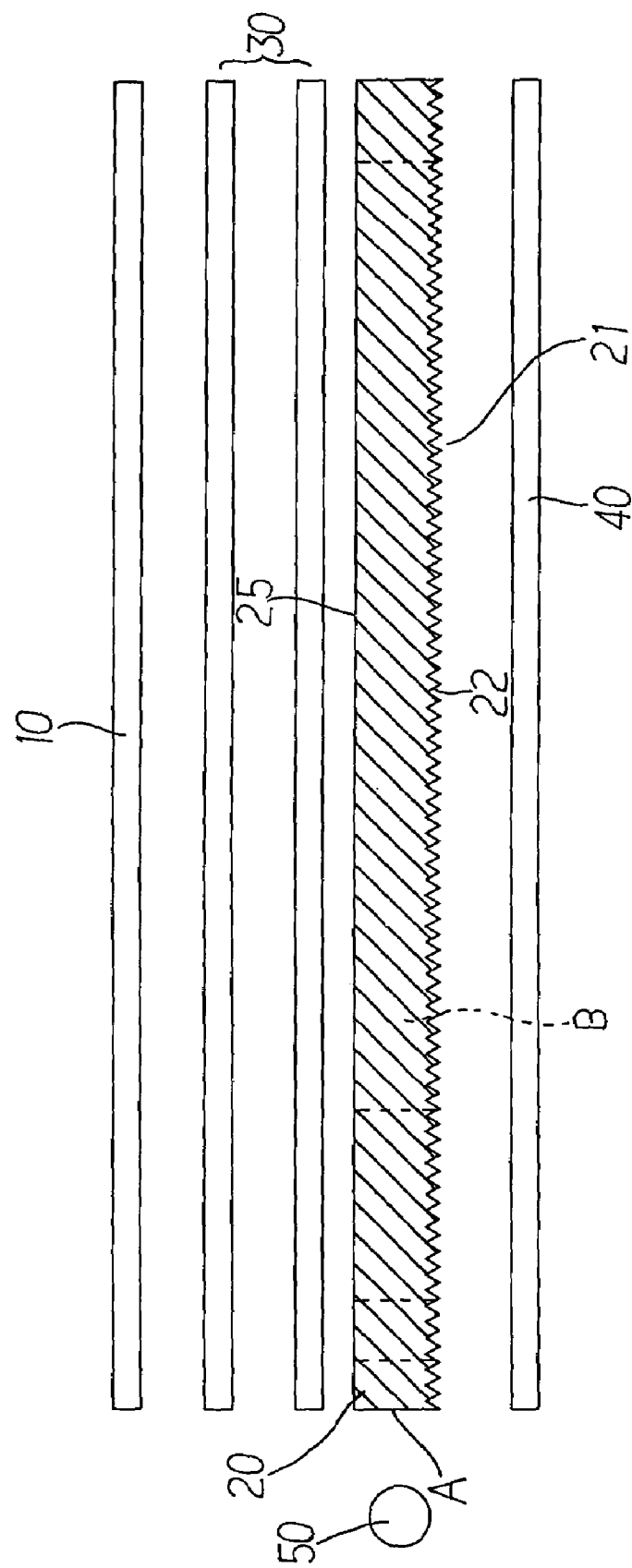
FIG. 2 is a schematic view of the structure of a backlight module of the present invention.
Figure 3:
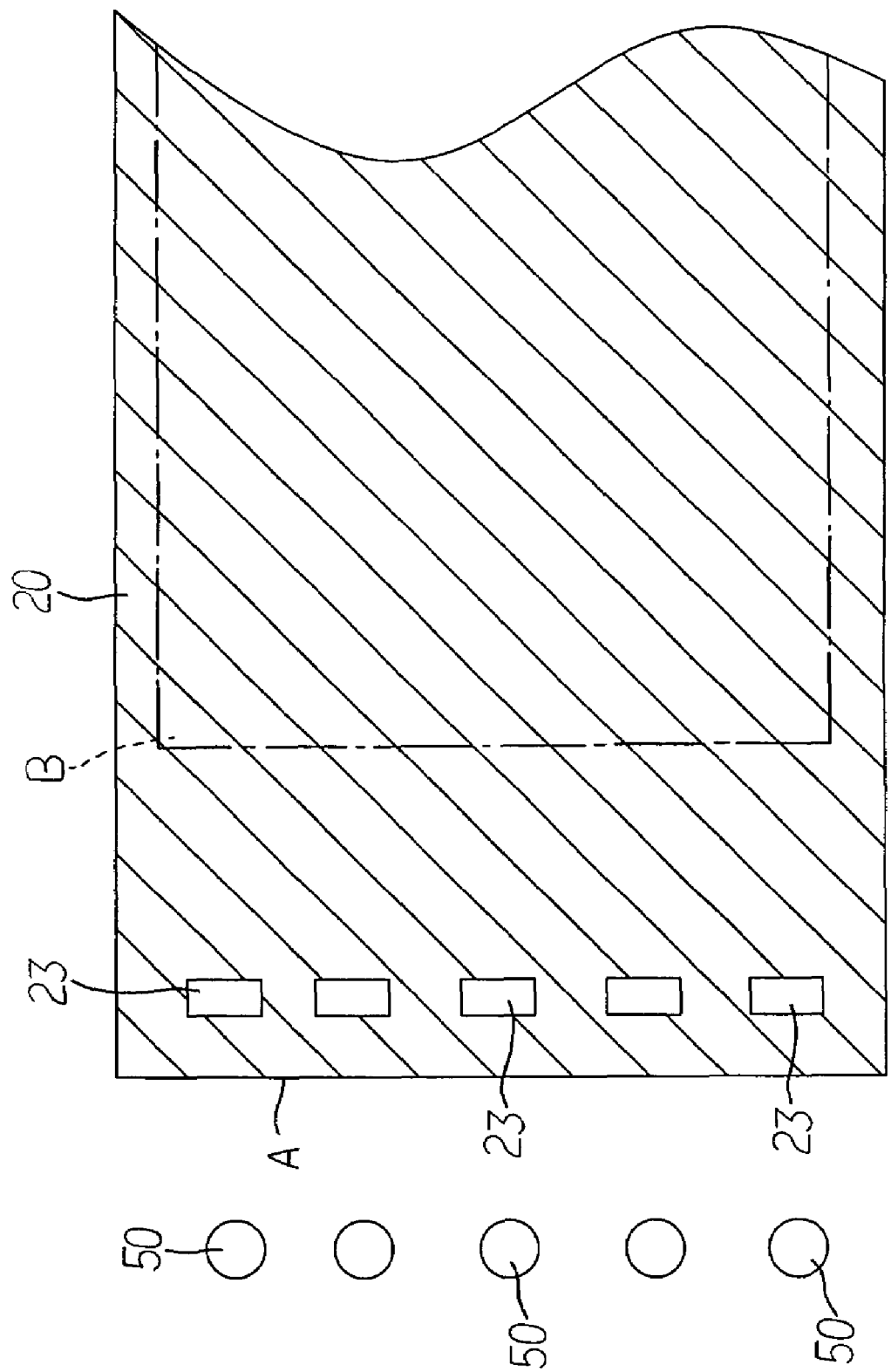
FIG. 3 is another schematic view of the structure of a backlight module of the present invention.

Referring to FIG. 2, a light guide plate structure of the present invention is illustrated. The basic structure of a whole backlight module as shown in FIGS. 2 and 3 also comprises a light guide plate 20 disposed at the bottom surface of a liquid crystal display panel 10, an optical film 30 formed by a prism or diffuser and installed at an emergent plane of the light guide plate 20, a reflective panel 40 installed at a reflective plane of the light guide plate 20, and a light source 50 installed on a side. If a light emitted from the light source 50 is projected to the light guide plate 20, the light will be guided and projected upward by the refraction and reflection of the light guide plate 20 and the reflective panel 40 and passed through the optical film 30 made of a prism or a diffuser to produce evener light emergent from the liquid crystal display panel 10.

Figure 4:
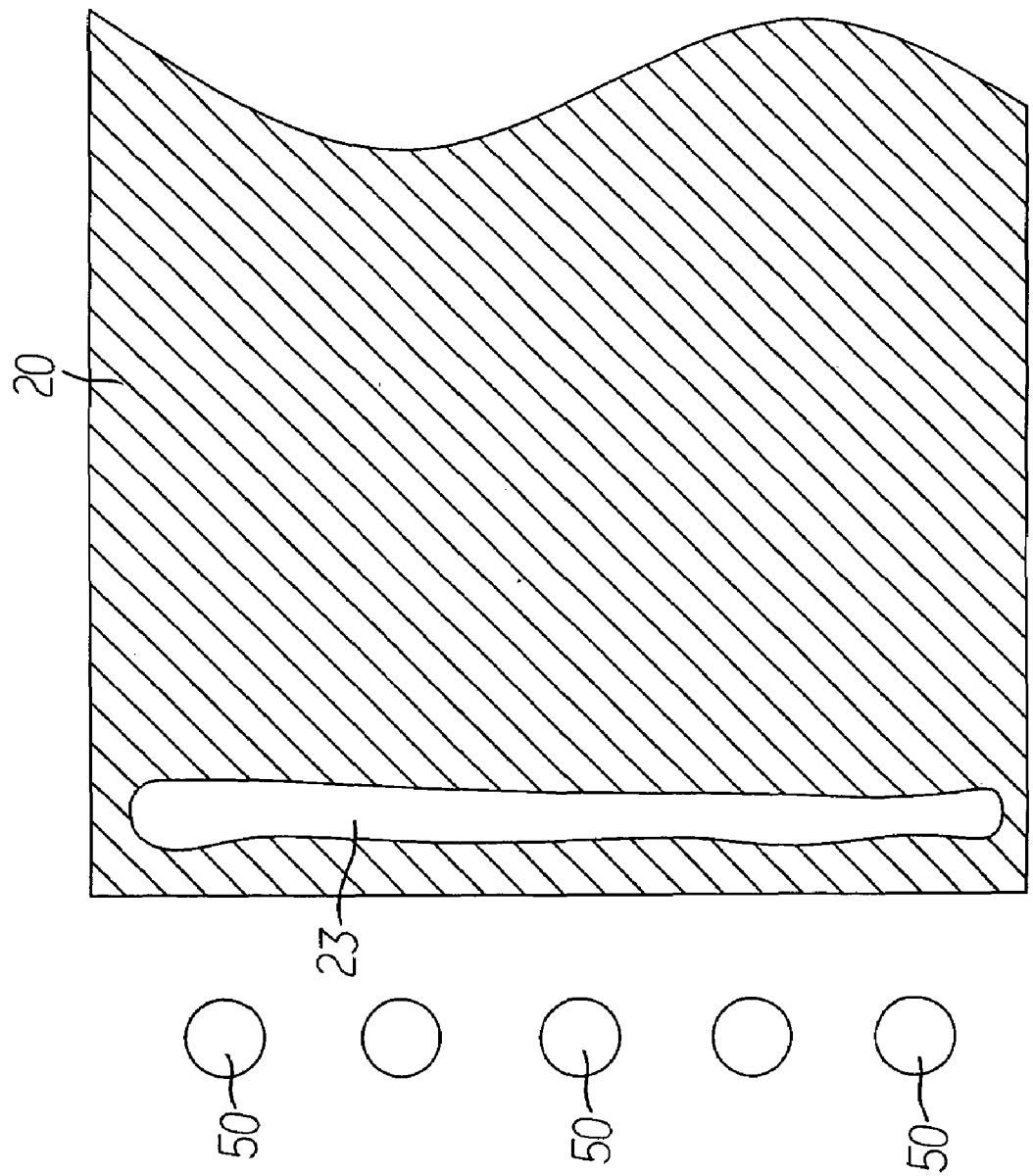
FIG. 4 is another further schematic view of the structure of a backlight module of the present invention.
Figure 5:
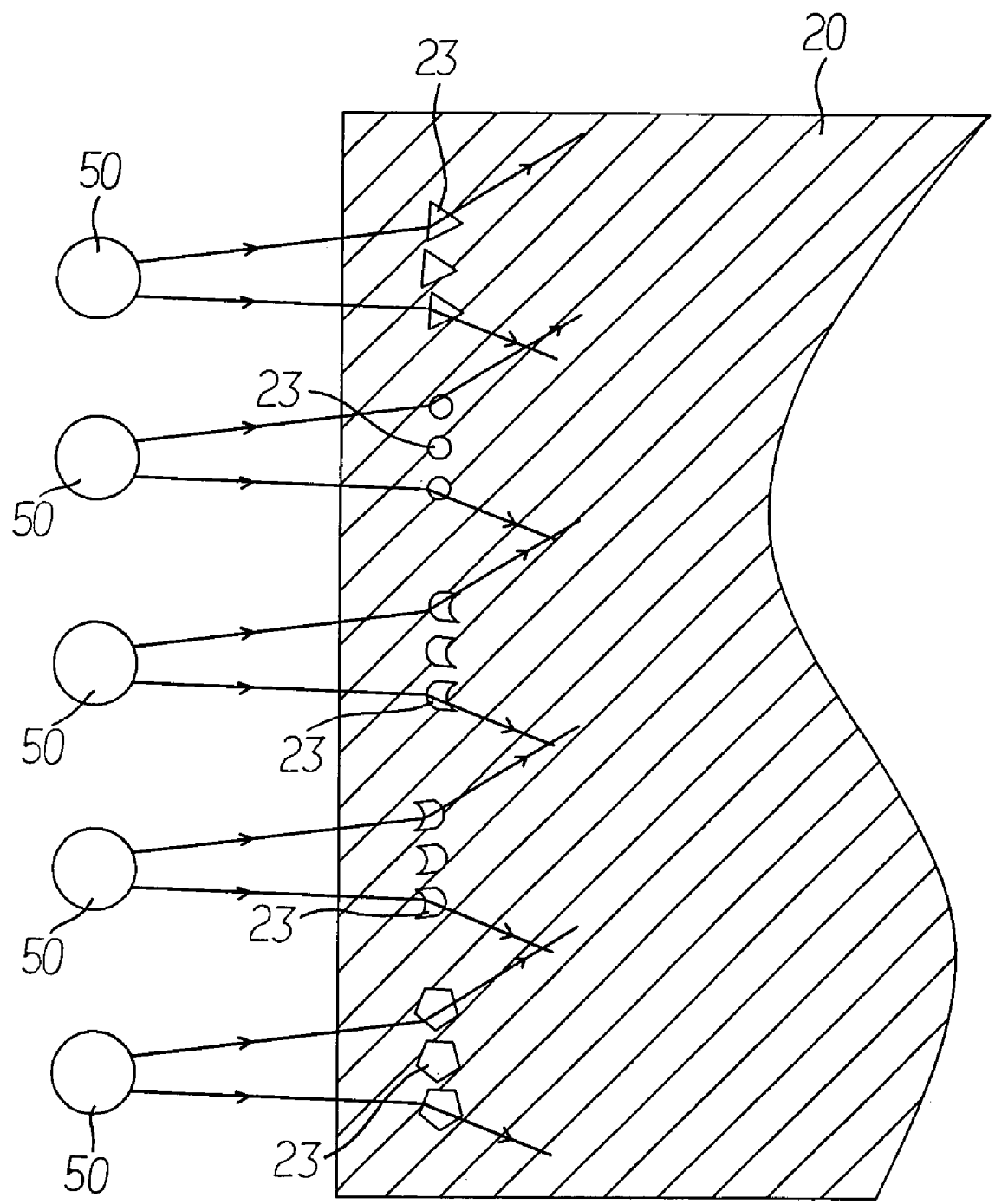
FIG. 5 is a schematic view of a light path of a backlight module of the present invention.

The technical characteristics of the present invention reside on that the light guide plate 20 forms more than one hollow layer 23 within an incident side A to an effective light emitting area B, and the hollow layers 23 could be continuous (as shown in FIG. 4) or discontinuous (as shown in FIG. 3) and of various geometric shapes, wherein the hollow layers 23 are installed at the corresponding positions of the light sources 50, so that a light of the light source 50 changes its light path when passing through the hollow layers 23 as shown in FIG. 5 to effectively distribute and evenly emit the light. Of course, the light guide plate 20 can have a pattern 22 with a light reflection function on a reflective plane 21 or an emergent plane 24, and the pattern 22 could be in a form of various geometric shapes to improve the light performance including luminance and evenness.

Figure 6:
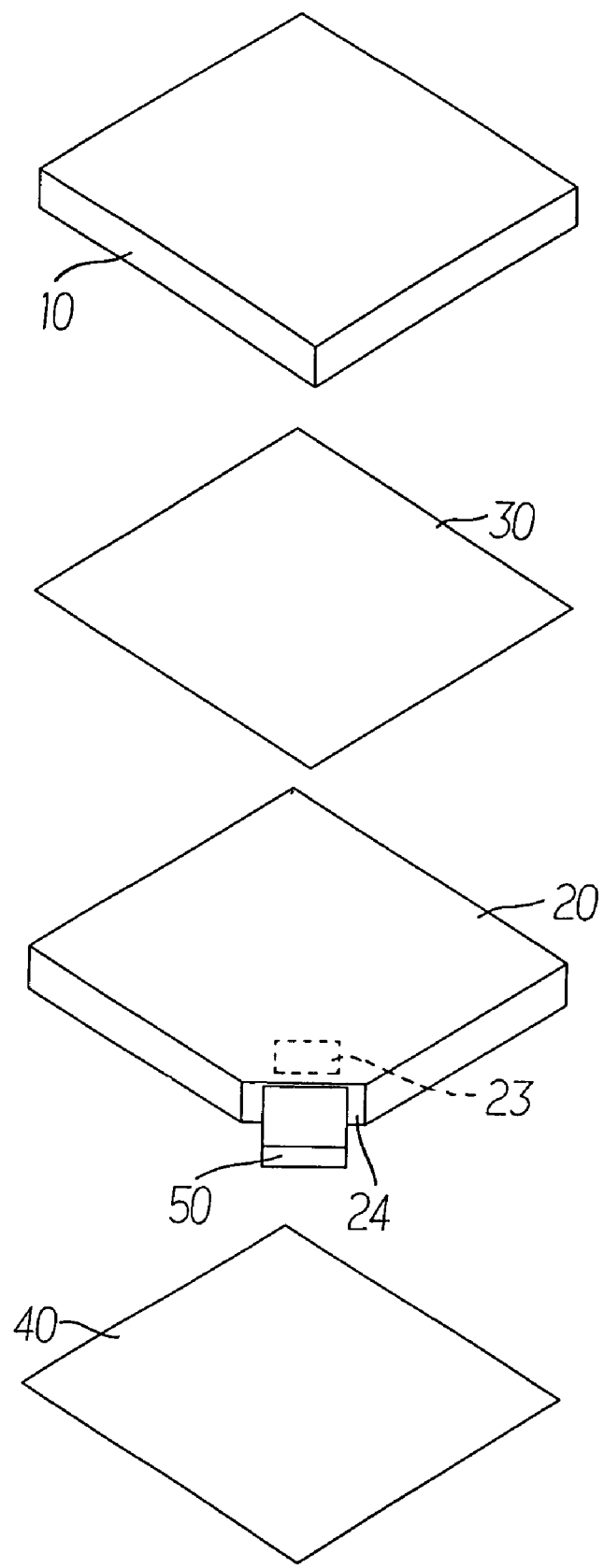
FIG. 6 is an exploded view of a backlight module according to another preferred embodiment of the present invention.

Referring to FIG. 6, the structure of a backlight module is shown. The light guide plate 20 further comprises an incident plane 24 at a corner section, and the incident plane 24 is a shape with an indented corner. The light source 50 is installed at the corner section, and the light enters into the light guide plate 20 through the incident plane 24. A reflective panel 40 is installed under the light guide plate 20, and the hollow layer 23 is disposed at a position corresponding to the light source 50. Similarly, the hollow layer 23 changes the light path of the light of the light source 50 so as to effectively overcome the issue of having bright and dark bands according to the prior art liquid crystal modules by more active and positive measures and distribute the light of the light source more effectively.

In summation of the above description, the present invention herein provides a feasible light guide plate structure and complies with the patent application requirements, and thus is submitted for patent application. However, the description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light guide plate structure of a backlight module, comprising: a light guide plate, a plurality of optical films, and a liquid crystal display panel in order on an emergent plane of a light source, wherein said light guide plate forms more than one hollow pattern disposed within an incident side to an effective light emitting area, thereby said hollow pattern of said light guide plate changes a light path of said light of said light source to effectively distribute and evenly emit said light, wherein said light guide plate forms a pattern with a light reflection function on a reflective plane or an emergent plane, and said pattern is in a form of various geometric shapes.

2. The light guide plate structure of backlight module of claim 1, wherein said light source is installed on a side of said light guide plate and a reflective panel is installed under said light guide plate.

3. The light guide plate structure of backlight module of claim 1, wherein said light guide plate has an incident plane at a corner section of said light guide plate, and said incident plane is in a shape having a truncated corner, and said light source is installed at said corner section, such that said light enters said light guide plate from said incident plane, and a reflective panel is installed under said light guide plate.

* * * * *